United States Patent [19]

Roth et al.

[11] Patent Number: 5,037,043
[45] Date of Patent: Aug. 6, 1991

[54] LOCKING ARRANGEMENT FOR UNFOLDED SOLAR GENERATORS

[75] Inventors: Martin Roth, Taufkirchen; Helmut Kiendl, München, both of Fed. Rep. of Germany

[73] Assignee: Messerschmitt-Boelkow-Blohm, Fed. Rep. of Germany

[21] Appl. No.: 571,412

[22] Filed: Aug. 23, 1990

[30] Foreign Application Priority Data

Aug. 24, 1989 [DE] Fed. Rep. of Germany ....... 3927941

[51] Int. Cl.⁵ ................................................ B64G 1/44
[52] U.S. Cl. ..................................... 244/173; 136/245
[58] Field of Search .................... 244/158 R, 173, 49; 52/70, 71, 108, 113; 160/183, 188, 193, 29, 206, 213; 136/245

[56] References Cited

U.S. PATENT DOCUMENTS 4,747,566  5/1988  Kiendl ............................... 244/173
4,880,188  11/1989  Roth et al. ......................... 244/173

FOREIGN PATENT DOCUMENTS 0172099  7/1989  Japan ................................. 244/173
0011498  1/1990  Japan ................................. 244/173
0015000  1/1990  Japan ................................. 244/173

Primary Examiner—Joseph F. Peters, Jr.
Assistant Examiner—Carla Mattix
Attorney, Agent, or Firm—Evenson, Wands, Edwards, Lenahan & McKeown

[57] ABSTRACT

A locking arrangement for unfoldable solar generators which consist of several panels provides a lockable, partially-unfolded, intermediate position and a lockable, completely unfolded final position. In the partially-unfolded position, a panel is pivoted by 90° so that a lock pin which is acted upon by a radially inwardly directed spring force and which, at first, slides on an outer section of a curve of a guiding contour, locks into an opening of a curved slot in a guiding element having the guiding contour. During the transition into the fully unfolded position, a plate cam, which had stopped at first, is rotated so that its driving groove can accommodate the lock pin which can now continue to slide on an inner section of the curve into the final locking position.

11 Claims, 2 Drawing Sheets

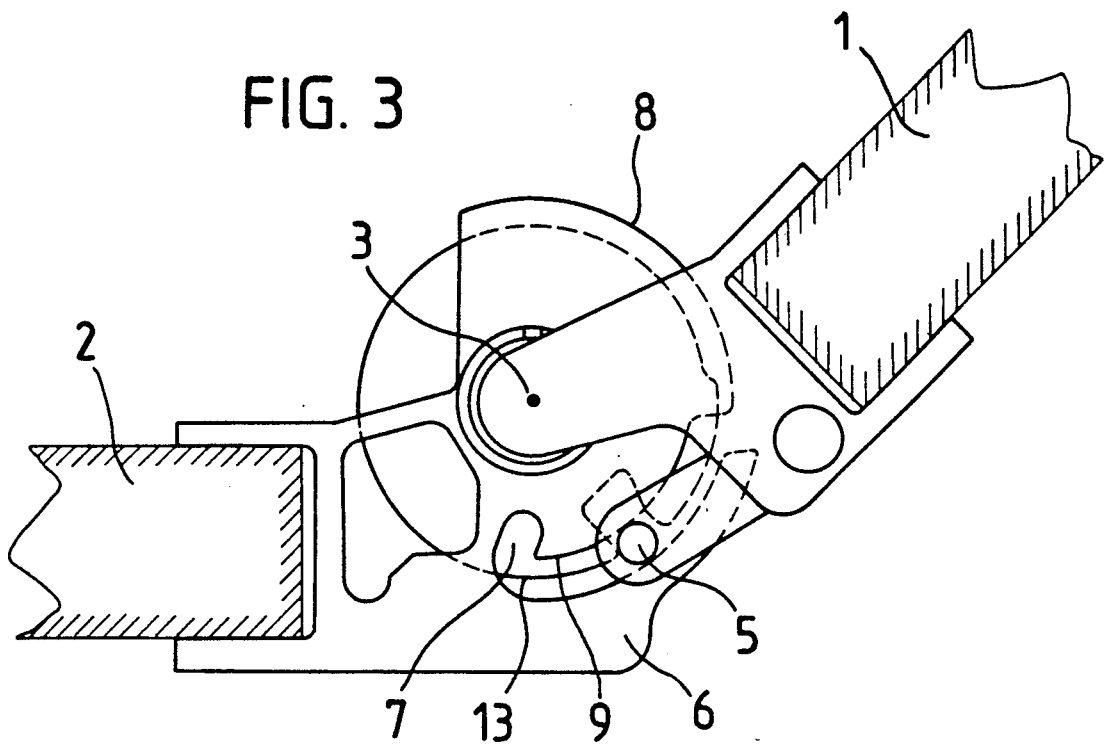
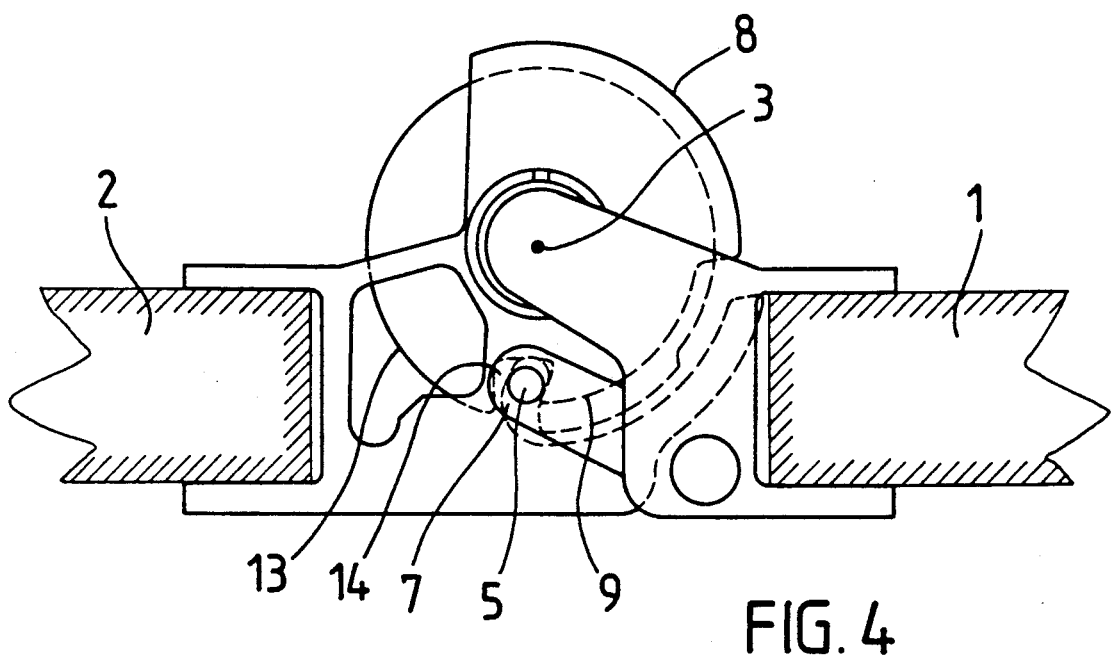

LOCKING ARRANGEMENT FOR UNFOLDED SOLAR GENERATORS

BACKGROUND AND SUMMARY OF THE INVENTION

The present invention relates to a locking arrangement for foldable solar generators and, more particularly, to a locking arrangement which permits a partial unfolding of at least one of the panels of a solar generator in an intermediate position and then a folding and locking in the final position.

A locking arrangement for solar generators is shown in DE-C2-32 15 434. In the past, solar generators for satellites were comprised of several panels carrying solar cells and were pivotally connected with respective adjacent panels. In the folded-up condition, the panels were disposed on one another and prevented from unfolding by special hold-down devices; the entire stack of panels rested against the satellite body. After the start of the unfolding operation by detaching the hold-down devices, the individual panels swivelled around respective axes of rotation into an altogether flat, unfolded (i.e., folded out) position. The unfolding movement could be caused by springs which, in the area of the axes of rotation, were initially prestressed and provided necessary torques. As an alternative, motor-driven cable pull mechanisms were also used, as described, for example, in *Aircraft Engineering*, January 1984, Pages 2 to 5, particularly in FIG. 4.

In the case of a locking arrangement of the type shown in DE-C2-32 15 434, one of two mutually adjacent panels respectively, on its side facing the common axis of rotation, had a detent lever which, at one of its ends, was pivoted at the panel and, at its other end, carried a lock or catch pin parallel to the axis. The respective other one of the two panels, on the side facing the common axis of rotation, was equipped with a guiding element which had a curved guiding contour, specifically a semicircular edge. At its end carrying the lock pin, the detent lever was acted upon by a spring force in the direction to the common axis of rotation so that the lock pin rested against the guiding contour. The guiding contour of the guiding element ended in a locking groove essentially cut in radially with respect to the axis of rotation. In the folded-up condition of such a solar generator, the lock pin, in each case, rested against the end of the guiding contour which faced away from the locking groove.

During the unfolding operation, two mutually adjacent panels respectively pivoted around the common axis of rotation, with the lock pin sliding along on the guiding contour until it finally locked into the locking groove where it was held under the effect of the spring force directed radially toward the inside. This spring force also provided that it remained in constant contact with the guiding contour during the unfolding operation. The length of the guiding contour or the sliding path of the lock pin until it locks into the locking groove was dimensioned such that, between the folded and the unfolded position, an angular distance of in each case approximately 180° was covered between two adjacent panels. The locking in the unfolded flat position of the solar generator, in each case, took place by locking of the lock pin in the locking groove where it was then held by spring force.

The solar generator, in which this known locking arrangement has been used, is brought into an altogether flat or unfolded position in a single unfolding operation. However, it sometimes required that the entire solar generator not be unfolded at once but initially, for example, only the outermost panel must be swivelled by 90°, while all other panels remain in the folded condition. This type of a partial unfolding may be desirable, for example, during a transfer orbit as long as the satellite has not yet reached its final, for example, geostationary, orbit, prior to which completely unfolded solar generators would be a hindrance during additional position changing or flight path changing maneuvers, such as, for example, when entering the apogee. During the partially unfolded state of the solar generators, a certain portion of the energy that can be generated is therefore already available, in order to be able to drive at least some of the energy-consuming components.

After the final orbit has been reached, the solar generator panel must be unfolded completely in which case, here also, the panels are altogether finally brought into a flat or unfolded position. In this case, also the last panel which, during the partial unfolding, had already been swivelled by approximately 90° must be swivelled by approximately another 90°. A locking arrangement must therefore exist between this last, i.e., outermost, panel and the second-to-the-last panel which, on one hand, makes it possible that the outermost panel is brought from the folded into the partially unfolded position, i.e., the position which is swivelled by 90°, and can be locked there temporarily, and which, on the other hand, ensures that the further unfolding into the flat end condition can finally take place with a subsequent locking. It may, of course, also be required that not only the outermost but, for example, the two outermost panels together must be subjected to a partial unfolding. In that case, the corresponding locking arrangement must be provided between the second-to-the-last and the panel that follows it in the direction toward the interior.

It is an object of the present invention to provide a locking arrangement which permits a partial unfolding of at least one of the panels of a solar generator composed of several panels, with low expenditures with respect to equipment and a high operational reliability. Furthermore, it is another object of the present invention to provide temporary locking of the at least one panel in an intermediate position which does not constitute the final flattened out or unfolded position of the solar generator, and the further unfolding into the final position and the subsequent locking therein.

These objects have been achieved in accordance with the present invention by providing a guiding contour which has an outer section of a curve which spans a first angular area and has a larger radial distance to a common axis of rotation, as well as a connecting inner section of a curve which spans a second angular area and has a smaller radial distance to the common axis of rotation. A plate cam with a curved outer contour is axially offset with respect to the guiding element and can be rotated around the common axis of rotation in the direction from the first toward the second angular area. A holding element hinders a lock pin after leaving the outer section of the curve of the guiding contour from carrying out a further shifting on the inner section of the curve as long as it has not been brought into engagement with the driving groove of the plate cam.

Accordingly, the guiding contour of the guiding element will now consist of two sections of a curve which connect to one another. An outer section of the curve which is characterized by a larger radial distance to the common axis of rotation is to span a first angular area. A connecting inner section of the curve which is characterized by a shorter radial distance to the common axis of rotation spans a second angular area. In addition, the plate cam is provided which is axially offset with respect to the guiding element and can be rotated around the common axis of rotation, specifically mainly in the rotating direction which is oriented from the first toward the second angular area. This plate cam has a radially cut-in driving groove and, otherwise, is to be provided with a curved outer contour like the guiding element. The radial distance of the outer contour from the common axis of rotation is, however, shorter than that of the outer section of the curve and longer than that of the inner section of the curve of the guiding contour of the guiding element. Finally, the holding element prevents that after the partial unfolding has taken place, which is implemented by way of the outer section of the curve of the guiding contour, the lock pin can be shifted still further on the inner section of the curve. In this case, the holding element must be arranged such that it prevents this further shifting only as long as the lock pin is not yet in engagement with the driving groove of the rotatable plate cam. This engagement takes place at the start of the final unfolding operation which will eventually follow the partial unfolding.

BRIEF DESCRIPTION OF THE DRAWINGS

These and other objects, features and advantages of the present invention will become more apparent from the following detailed description of a presently preferred embodiment when taken in conjunction with the accompanying drawings wherein:

FIG. 3 is a schematic representation of the locking arrangement according to FIG. 1 as it moves towards to a final unfolding; and FIG. 4 is a schematic representation of the locking arrangement according to FIG. 1 in the completely unfolded state.

DETAILED DESCRIPTION OF THE DRAWINGS

Figure 1:
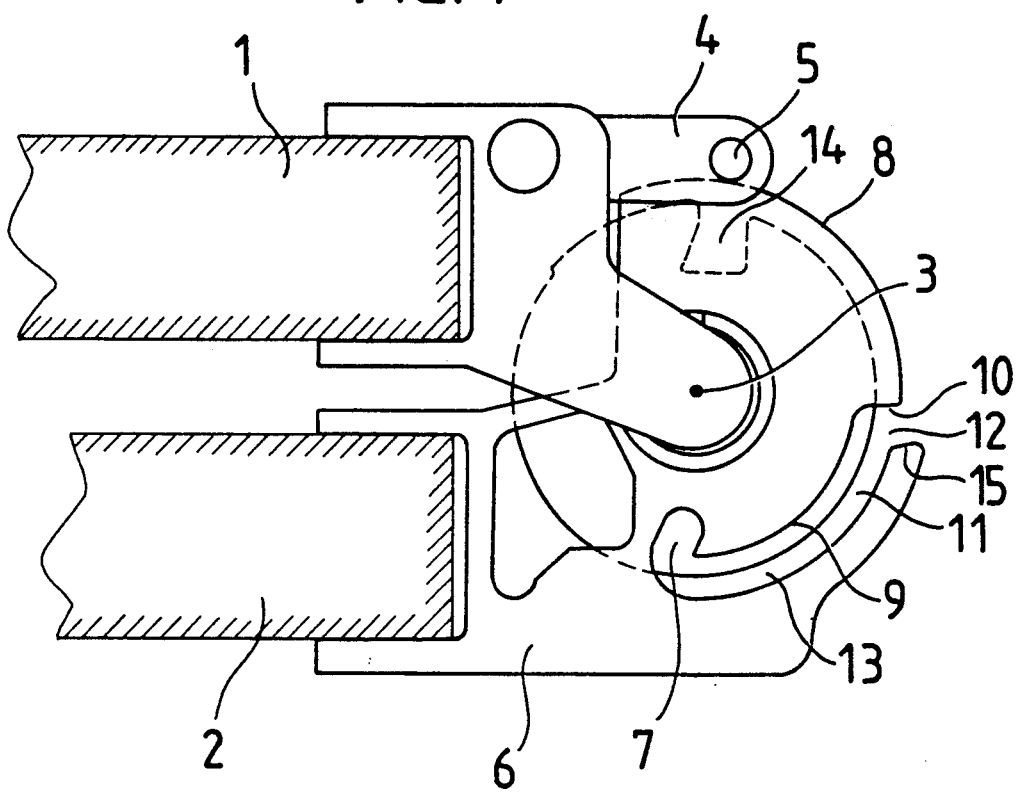
FIG. 1 is a schematic representation of a locking arrangement according to the present invention in the folded-up state of two adjacent solar generator panels.

FIG. 1 shows mutually adjacent parts of two panels 1 and 2 of a folding (i.e., folded up)/unfolding solar generator, which panels are pivotally connected with one another and can be rotated around a common axis 3 of rotation. FIG. 1 illustrates the condition in which all panels of the solar generator are disposed on one another, and this solar generator is therefore completely folded up. Of all the panels of the solar generator, only a portion of two panels are shown; the other panels are connected with these and with one another in the manner of an accordion by way of axes of rotation which are in parallel to the illustrated axis 3 of rotation.

On its side facing the common axis 3 of rotation, the one panel 1 carries a detent lever 4 which, at one end, is pivoted at the panel 1 and, at its other end, is provided with a lock pin 5 which extends parallel to the axis of rotation 3. On its side facing the common axis 3 of rotation, the other panel 2 has a guiding element 6 with a curved guiding contour ending in a locking groove 7. The guiding contour is divided into an outer section 8 of a curve and into an inner section 9 of a curve. With respect to the common axis 3 of rotation, the outer section 8 of the curve has a larger radial distance from the axis 3 of rotation than the inner section 9 of the curve. A step 10 is therefore created in the guiding contour between the outer section 8 and the inner section 9. The outer section 8 of the curve spans a first angular area of approximately 90°; the inner section 9 of the curve spans a second angular area of also almost 90° and also it forms the inner boundary of a curved slot 11 in the guiding element 6 which, on its one side, leads into the locking groove 7 and on its other side facing the outer section 8 of the curve, leads into an opening 12 directed toward the outside. The width of this opening 12 corresponds at least to the diameter of the lock pin 5.

A plate cam 13 is mounted axially offset with respect to the guiding element 6, and rotatably around the common axis 3 of rotation. It is important for the operation of the invention that the plate cam 13 can be rotated in the direction from the first angular area (outer section 8 of the curve) toward the second angular area (inner section 9 of the curve). The plate cam 13 has a radially cut-in driving groove 14, the width of which is dimensioned such that it is suitable for receiving the lock pin 5. The end of the detent lever 4 carrying the lock pin 5 is pulled toward the axis 3 of rotation by a spring (not shown) so that the lock pin 5 which rests or rides against the outer section 8 of the curve of the guiding contour is held in permanent contact with it. The outer and the inner section 8, 9 of the curve of the guiding contour of the guiding element 6 each have a circular-arc shape. However, this is not absolutely required; other curve forms are also conceivable, e.g., those in which the radial distance to the axis 3 of rotation is increasingly reduced in the above-mentioned rotating direction. In the present embodiment, the plate cam 13 has, for example, a circular shape, its radius being selected to be smaller than that of the outer section 8 of the curve and larger than that of the inner section 9 of the curve.

Figure 2:
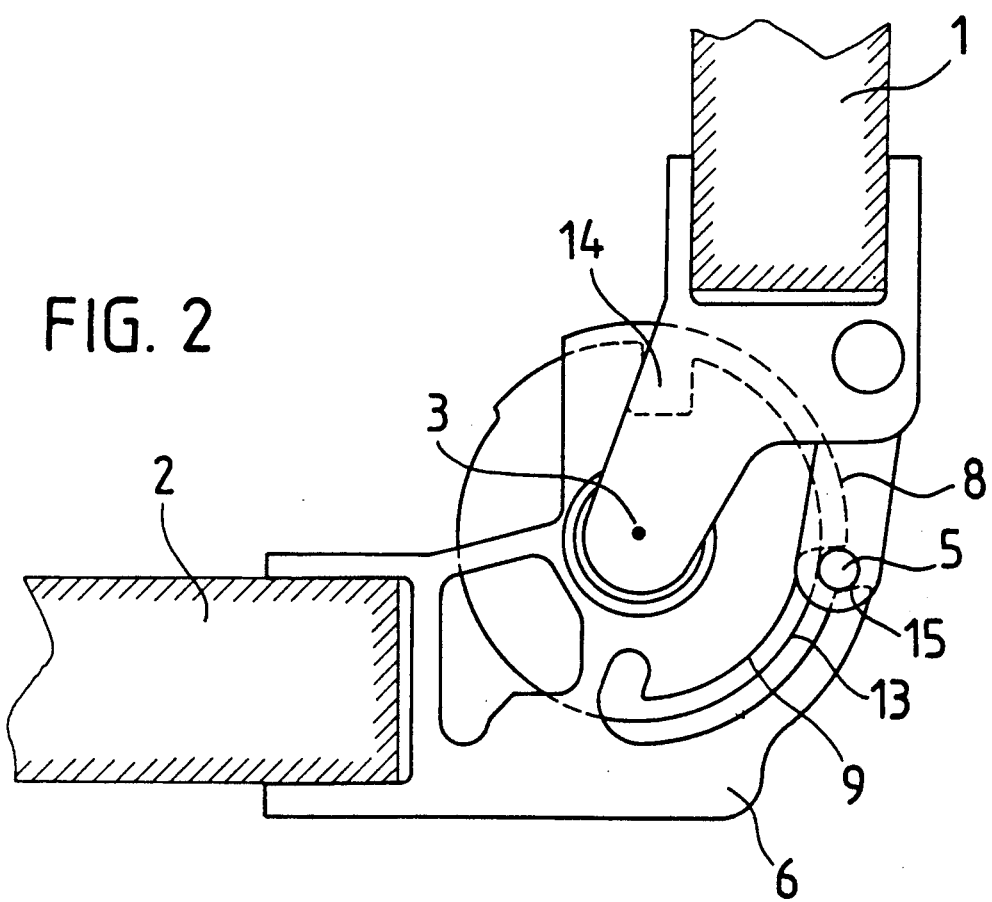
FIG. 2 is a schematic representation of the locking arrangement of FIG. 1 but in the partially unfolded state of the two panels.

In order to bring the panel 1 into a condition of partial unfolding with respect to the panel 2, hold-down devices (not shown) by means of which the panel 1 is held firmly down on panel 2 must first be released. Then the swivel motion of panel 1 may take place around a first angular area, specifically clockwise in the shown embodiment. For this purpose, a corresponding torque is exercised on panel 1, for example, by a motor driven cable pull mechanism (not shown), or by prestressed springs (not shown) applied in the area of the axis 3 of rotation. During the clockwise swivel motion of the panel 1, the lock bolt 5 slides on the outer section 8 of the curve of the guiding contour until, after a rotation of the panel 1 by approximately 90°, it arrives in the opening 12 of the curved slot 11 (FIG. 2). As a result of the pulling effect of the spring (not shown) acting in the direction toward the axis 3 of rotation, the lock pin 5 in the opening 12 comes in contact with the curved, specifically circular, outer contour of the plate cam 13. The plate cam 13 is uncoupled from the rotation of panel 1 and thus carries out no rotating movement during the partial unfolding.

As shown in FIG. 2, the lock pin 5 is now fixed in the opening 12 because a holding element 15 prevents it from shifting further clockwise on the outer contour of the plate cam 13. The holding element 15 is formed by the edge of the opening 12 which faces away from the outer section 8 of the curve, the curved slot 11 leading into this opening 12. Because of the radial spring effect, the lock pin 5 can also no longer leave the opening 12 by itself. The position shown in FIG. 2 therefore corresponds to the condition of the locked partial unfolding in which the panel 1 is swivelled with respect to the panel 2 by the amount of a first angular area, here approximately 90°. In this case, it is also a prerequisite that the other panels (not shown) which follow from panel 2 toward the inside, continue to be in the folded-up condition, and thus together with panel 2, as a compact stack of panels, rest against the satellite body where they are held by a second hold-down device (not shown). In this condition of partial unfolding of the solar generator or generators, the satellite is generally aligned such that the partially unfolded outermost panel 1 with its surface normal to the panel 2 is directed completely toward the sun so that a portion of the overall energy which can be generated is already available.

If now the complete unfolding of the panel 1 with respect to the panel 2 is to be initiated, the plate cam 13 is set into rotation, specifically clockwise in the illustrated embodiment. After a rotation of approximately 90°, the driving groove 14 will then reach a position where it is directly opposite to the opening 12 so that the lock pin 5, under a radially directed spring bias toward the inside, is pulled into the driving groove 14 and rests against the inner section 9 of the curve of the guiding contour of the guiding element 6. The holding element 15 is now no longer able to prevent the lock pin 5 from moving further along the inner section 9 of the curve. The same applies to the further rotation of the panel 1 which had also been blocked up to now by the fact that the lock pin 5 was held by the holding element 15. It is, of course, a prerequisite that the distance between the outer contour of the plate cam 13 as well as the inner edge of the holding element 15, in the area of the opening 12 is less than the diameter of the lock pin 5. In addition, in the illustrated embodiment, the radial width of the curved slot 11 must be at least as large as the diameter of the lock pin 5.

An intermediate condition of the further unfolding is shown in FIG. 3 in which the plate cam 13 is already rotated so far that the driving groove 14 is situated approximately in the center between the opening 12 and the locking groove 7. During the further unfolding, which takes place by way of the second angular area of also approximately 90°, that is, by way of the length of the inner section 9 of the curve, or already from the start of the rotation of the plate cam 13 out of the position shown in FIG. 2, rotation of the panel 1 may be coupled with the unfolding of the other panels. This may take place by constructing the plate cam 13 as a cable pulley and including it in, for example, a conventional motor-driven cable pull mechanism. However, this is not absolutely necessary for the present invention because the plate cam 13 may also be completely independent from the other unfolding mechanisms. Care must only be taken that the plate cam 13, during the partial unfolding, is uncoupled at least so far from the rotation of panel 1 with respect to panel 2 that the driving groove 14, at the end of the partial unfolding when the lock pin 5 is pulled into opening 12, has not yet been rotated up to this opening. The initial position of driving groove 14 is not limited to that illustrated in FIG. 1. In an extreme case, for example, this initial position may be situated directly in front of the angular position in which opening 12 is located.

According to FIG. 4, panel 1 finally reaches a position where the lock pin 5 under the radially inwardly directed spring bias is pulled into the locking groove 7 and is held there, and the panel is therefore locked. The angular distance between the two panels 1 and 2 now amounts to 180°, and panel 1 rests stably against stops (not shown) of panel 2. The other panels are now also completely unfolded, and the whole solar generator composed of these panels is now therefore in an overall flat or unfolded position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A locking arrangement for unfolding solar generators having several panels pivotally connected with respective adjacent panels about axes of rotation, comprising a detent lever associated with a side of one of two mutually adjacent panels facing the axis of rotation common to the two adjacent panels with one end of the detent lever pivoted on the one panel and equipped at another end with a lock pin having an axis approximately parallel to the common axis of rotation, and being spring based toward the common axis of rotation, and a guiding element associated with the other of the two panels having a curved guiding contour ending in a locking groove, the lock pin shiftably resting against the guiding contour, wherein the guiding contour has a curve with an outer section which spans a first angular area and has a first radial distance to the common axis of rotation and a connecting inner section which spans a second angular area and has a second radial distance to the common axis of rotation smaller than first radial distance, a plate cam with a curved outer contour is axially offset with respect to the guiding element, and is arranged to be rotated around the common axis of rotation in a direction from the first angular area toward the second angular area, and the plate cam further having a radially cut-in driving groove, the radial distance of the plate cam from the common axis of rotation being smaller than that of the outer section and larger than that of the inner section, and a holding element is provided to hinder the lock pin after leaving the outer section and from carrying out a further shifting on the inner section as long as the lock pin has not yet been brought into engagement with the driving groove of the plate cam.

2. The locking arrangement according to claim 1, wherein the outer section and the inner section have a circular arc shape.

3. The locking arrangement according to claim 1, wherein the inner section represents the inner boundary of a curved slot in the guiding element which, on one of its sides, leads into the locking groove and, at its other side facing the outer section, leads into an outwardly directed opening with a width that corresponds at least to the diameter of the lock pin, the edge of the opening facing away from the outer section forming the holding element.

4. The locking arrangement according to claim 3, wherein the outer section and the inner section have a circular arc shape.

5. The locking arrangement according to claim 1, wherein the plate cam has an approximately circular disk shape.

6. The locking arrangement according to claim 5, wherein the outer section and the inner section have a circular arc shape.

7. The locking arrangement according to claim 6, wherein the inner section represents the inner boundary of a curved slot in the guiding element which, on one of its sides, leads into the locking groove and, at its other side facing the outer section, leads into an outwardly directed opening with a width that corresponds at least to the diameter of the lock pin, the edge of the opening facing away from the outer section forming the holding element.

8. The locking arrangement according to claim 1, wherein each of the first and the second angular area extend approximately 90°.

9. The locking arrangement according to claim 8, wherein the outer section and the inner section have a circular arc shape.

10. The locking arrangement according to claim 9, wherein the inner section represents the inner boundary of a curved slot in the guiding element which, on one of its sides, leads into the locking groove and, at its other side facing the outer section, leads into an outwardly directed opening with a width that corresponds at least to the diameter of the lock pin, the edge of the opening facing away from the outer section forming the holding element.

11. The locking arrangement according to claim 10, wherein the plate cam has an approximately circular disk shape.

* * * * *